United States Patent
Kuta et al.

(10) Patent No.: US 11,461,948 B2
(45) Date of Patent: Oct. 4, 2022

(54) SYSTEM AND METHOD FOR VOICE DRIVEN LIP SYNCING AND HEAD REENACTMENT

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Amitay Nachmani, Tel Aviv (IL); Matan Ben-Yosef, Tel Aviv (IL); Or Gorodissky, Tel Aviv (IL)

(73) Assignee: DE-IDENTIFICATION LTD., Tel Aviv (IL)

(*) Notice: Subject to any disclaimer, the term of this patent is extended or adjusted under 35 U.S.C. 154(b) by 0 days.

(21) Appl. No.: 17/377,109

(22) Filed: Jul. 15, 2021

(65) Prior Publication Data

US 2022/0020196 A1 Jan. 20, 2022

Related U.S. Application Data

(60) Provisional application No. 63/052,061, filed on Jul. 15, 2020.

(51) Int. Cl.
*G06T 13/20* (2011.01)
*G10L 15/02* (2006.01)
(Continued)

(52) U.S. Cl.
CPC ........... *G06T 13/205* (2013.01); *G06N 20/00* (2019.01); *G06T 13/40* (2013.01); *G06T 13/80* (2013.01); *G10L 15/02* (2013.01)

(58) Field of Classification Search
CPC ....... G06T 13/205; G06T 13/40; G06T 13/80; G06T 2207/30201; G06T 2207/10016;
(Continued)

(56) References Cited

U.S. PATENT DOCUMENTS

| 6,278,791 B1 | 8/2001 | Honsinger et al. |
| 8,270,718 B2 | 9/2012 | Drory et al. |

(Continued)

FOREIGN PATENT DOCUMENTS

| EP | 3451209 | 3/2019 |
| KR | 102123248 | 6/2020 |

(Continued)

OTHER PUBLICATIONS

Palaskar et al, Learned in Speech Recognition: Contextual Acoustic Word Embeddings; Date of Conference: May 12-17, 2019; https://ieeexplore.ieee.org/abstract/document/8683868; pp. 6530-6534 (Year: 2019).*

(Continued)

*Primary Examiner* — Xilin Guo
(74) *Attorney, Agent, or Firm* — Pearl Cohen Zedek Latzer Baratz LLP

(57) ABSTRACT

A system and method voice driven animation of an object in an image by sampling an input video, depicting a puppet object, to obtain an image, receiving audio data, extracting voice related features from the audio data, producing an expression representation based on the voice related features, wherein the expression representation is related to a region of interest, obtaining from the image, auxiliary data related to the image and generating a target image based on the expression representation and the auxiliary data.

18 Claims, 4 Drawing Sheets

(51) Int. Cl.
    *G06N 20/00* (2019.01)
    *G06T 13/40* (2011.01)
    *G06T 13/80* (2011.01)

(58) Field of Classification Search
    CPC ...... G06N 20/00; G06N 3/006; G06N 3/0454;
    G06N 7/005; G06N 5/02; G10L 15/02;
    G10L 15/22; G10L 15/26; G10L 13/00;
    G10L 2021/105; H04N 19/176; H04N
    21/84; G06V 20/46; G06V 10/40; G06V
    40/174; G06V 40/20; G06F 3/015; G06F
    3/016
    See application file for complete search history.

(56) References Cited

U.S. PATENT DOCUMENTS

| | | | |
|---|---|---|---|
| 9,105,119 | B2 | 8/2015 | Whitehill et al. |
| 2007/0236513 | A1 | 10/2007 | Hedenstroem et al. |
| 2009/0135177 | A1* | 5/2009 | Strietzel ............... G06T 13/40 |
| | | | 704/E15.005 |
| 2010/0074525 | A1 | 3/2010 | Drory et al. |
| 2011/0123118 | A1 | 5/2011 | Nayar et al. |
| 2012/0177248 | A1 | 7/2012 | Shuster |
| 2012/0288166 | A1 | 11/2012 | Sun et al. |
| 2014/0328547 | A1 | 11/2014 | Whitehill et al. |
| 2014/0355668 | A1* | 12/2014 | Carmel ............... H04N 19/192 |
| | | | 375/240.02 |
| 2015/0261995 | A1 | 9/2015 | Hudgins |
| 2015/0324633 | A1 | 11/2015 | Whitehill et al. |
| 2017/0301121 | A1 | 10/2017 | Whitehill et al. |
| 2017/0302661 | A1 | 10/2017 | Conell et al. |
| 2019/0147340 | A1 | 5/2019 | Zhang et al. |
| 2019/0188562 | A1 | 6/2019 | Edwards et al. |
| 2019/0238568 | A1 | 8/2019 | Goswami et al. |
| 2019/0332850 | A1 | 10/2019 | Sharma et al. |
| 2020/0097767 | A1 | 3/2020 | Perry et al. |
| 2020/0234480 | A1 | 7/2020 | Volkov et al. |
| 2020/0358983 | A1* | 11/2020 | Astarabadi ........... G06V 40/171 |
| 2020/0410739 | A1* | 12/2020 | Shin ................... G10L 15/22 |
| 2021/0224319 | A1* | 7/2021 | Ingel ................... G10L 17/26 |

FOREIGN PATENT DOCUMENTS

| | | |
|---|---|---|
| MX | 354612 | 3/2018 |
| WO | WO 2015/039084 | 3/2015 |
| WO | WO 2015/039086 | 3/2015 |
| WO | WO 2016/107651 | 7/2016 |
| WO | WO 2018/225061 | 12/2018 |
| WO | WO 2019/014487 | 1/2019 |

OTHER PUBLICATIONS

Liang Du et al. "GARP-Face: Balancing Privacy Protection and Utility Preservation in Face De-identification" IEEE International Joint Conference on Biometrics, Clearwater, FL, 2014, pp. 1-8.
Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. pp. 18-33, Springer, Berlin, Heidelberg.
Jourabloo et al. "Attribute Preserved Face De-identification" 2015 International Conference on Biometrics (ICB), Phuket, 2015, pp. 278-285.
Meng et al. "Face De-identification for Privacy Protection" 2014 37th International Convention on Information and Communication Technology, Electronics and Microelectronics (MIPRO), Opatija, 2014, pp. 1234-1239.
Gross et al. "Face De-Identification" In: Senior A. (eds) Protecting Privacy in Video Surveillance, pp. 129-146, Springer, London. 2009.
BITOUK et el. "Face Swapping: Automatically Replacing Faces in Photographs" ACM Trans. Graph. 27, Aug. 3, 2008, pp. 1-8.
Muraki et al. "Anonymizing Face Images by Using Similarity-Based Metric" 2013 International Conference on Availability, Reliability and Security, Regensburg, 2013, pp. 517-524.
Chi et al. "Facial Image De-Identification using Identity Subspace Decomposition" 2014 IEEE International Conference on Acoustics, Speech and Signal Processing (ICASSP), Florence, 2014, pp. 524-528.
Gross, Ralph, et al. "Multi-pie." NIH Public Access, National Institute of Health. Proc Int Conf Autom Face Gesture Recongnit, May 1, 2010; 28(5): 807-813.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.
Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." Association for the Advancement of Artificial Intelligence (www.aaai.org). Google Research Google, Inc.
Das, Nilaksh et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg. 2012. pp 679-692.
Messer, Kieron, et al. "XM2VTSDB: The extended M2VTS database." Second international conference on audio and video-based biometric person authentication. vol. 964. 1999.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv: 1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.
Schmidhuber, Jurgen. "Deep Learning in Neural Networks: An Overview." arXiv preprint arXiv: 1404.7828 (2014).
Girshick, Ross. "Fast r-cnn." Proceedings of the IEEE international conference on computer vision. 2015. pp. 1440-1448.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016. pp 2574-2482.
Xie, Cihang, et al. "Adversarial examples for semantic segmentation and object detection." Proceedings of the IEEE International Conference on Computer Vision. 2017. pp 1369-1378.
Olah, Chris, et al. "The building blocks of interpretability." Distill 3.3 (2018): e10.
Szegedy, Christian, et al. "Intriguing properties of neural networks." arXiv preprint arXiv:1312.6199 (2013).
Papernot, Nicolas, et al. "Practical black-box attacks against machine learning." Proceedings of the 2017 ACM on Asia Conference on Computer and Communications Security. ACM, 2017.

(56) References Cited

OTHER PUBLICATIONS

Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 545-552.
Xiangxin Zhu and Ramanan, Deva "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." ICLR 2015 (Apr. 10, 2014).
Goodfellow, Ian J., Jonathon Shlens, and Christian Szegedy. "Explaining and harnessing adversarial examples." ICLR 2015 (Mar. 20, 2015).
Perez et al. "Face recognition and De-Identification in the frequency domain", National Institute of Astrophysics, Optics and Electronics Dec. 31, 2016.
Sendik "What's in a face? Metric learning for face characterization" Computer Graphics Forum, 2019 vol. 38 (2019), No. 2 EUROGRAPHICS 2019 / P. Alliez and F. Pellacini.
He et al. "AttGAN: Facial Attribute Editing By Only Changing What You Want" Jul. 25, 2018 Submitted Manuscript to IEEE Transactions on Image Processing.
Chi Hehua et al. "Face de identification using facial identity preserving features" Dec. 14, 2015 pp. 586-590 2015 IEEE Global Conference on Signal and Information Processing (Global SIP).
PCT International Search Report for App. No. PCT/IL2020/050907 dated Nov. 30, 2020.
PCT International Search Report for App. No. PCT/IL2019/050993 dated Dec. 31, 2019.
European Search Report for App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005;17(2):232-43.
European Search Report for Application No. EP20202094.7 dated Mar. 22, 2021.
PCT Search Report for Application No. PCT/IL2020/051287 dated Mar. 25, 2021.
PCT Search Report for Application No. PCT/IL2020/051291 dated Jan. 25, 2021.
Ren, Zhongzheng; Lee, Yong Jae; Ryoo. Learning to Anonymize Faces for Privacy Preserving Action Detection. Eprint arXiv:1803.11556, Jul. 26, 2018.
Letournel, Geoffrey; Bugeau, Aur?Lie; Ta, Vinh-Thong; Domenger, Jean-Philippe. Face De-identification with Expressions Preservations. International Conference on Image Processing (ICIP) 2015, Sep. 2015.
PCT Search Report for Application No. PCT/IL2020/051286, dated Mar. 18, 2021.
Justus Thies et al. "Face2Face: Real-time Face Capture and Reenactment of RGB Videos" CVPR2016, Jul. 29, 2020.
Naruniec et al. "High-Resolution Neural Face Swapping for Visual Effects" vol. 39 No. 4 (2020) Eurographics Symposium on Rendering 2020.
Hyeongwoo Kim et al. "Deep Video Portraits" ACM Transactions on Graphics (TOG) vol. 37, No. 4, May 29, 2018.
Thies et al. "Deferred Neural Rendering: Image Synthesis using Neural Textur" Apr. 28, 2019.
Thies et al. "Neural Voice Puppetry: Audio-driven Facial Reenactment" arXiv preprint arXiv:1912.05566 Dec. 11, 2019.
Fried et al. "Text-based editing of talking-head video" ACM Transactions on Graphics vol. 38 Issue 4 Article No. 68, pp. 1-14, Jul. 4, 2019.
Office Action for U.S. Appl. No. 17/223,561, dated Jun. 22, 2021.
Ha et al. "MarioNETte: Few-shot Face Reenactment Preserving Identity of Unseen Targets" arXiv:1911.08139, Nov. 19, 2019.
Garrido et al. "Automatic Face Reenactment" 2014 ECC papers European Conference on Computer Vision.
Gross, Ralph, et al. "Multi-pie." NIH Public Access, National Institute of Health. Proc Int Conf Autom Face Gesture Recongnit, May 1, 2010; vol. 28(5): pp. 807-813.
Baluja, Shumeet, and Ian Fischer. "Adversarial transformation networks: Learning to generate adversarial examples." Association for the Advancement of Artificial Intelligence (www.aaai.org). Google Research Google, Inc., 2017.
Schmidhuber, Jurgen. "Deep Learning in Neural Networks: An Overview." Neural Networks, vol. 61, Jan. 2015, pp. 85-117 (available online Oct. 2014).
Szegedy, Christian, et al. "Intriguing properties of neural networks." ICLR 2014 conference submission (Dec. 24, 2013).
Csaji, Balazs Csanad. "Approximation with artificial neural networks." Faculty of Sciences, Etvs Lornd University, Hungary 24 (2001): p. 48.
Belhumeur, Peter N. et al. "Localizing parts of faces using a consensus of exemplars." IEEE transactions on pattern analysis and machine intelligence, vol. 35.12 (2013): pp. 545-552.
Sendik "What's in a face? Metric learning for face characterization" EUROGRAPHICS, Computer Graphics Forum, 2019, vol. 38 (2019), No. 2 / P. Alliez and F. Pellacini, Eds.
He et al. "AttGAN: Facial Attribute Editing By Only Changing What You Want", Submitted Manuscript to IEEE Transactions on Image Processing, Jul. 25, 2018.
Chi Hehua et al. "Face de identification using facial identity preserving features", 2015 IEEE Global Conference on Signal and Information Processing (Global SIP), Dec. 14, 2015. pp. 586-590.
International Search Report for PCT App. No. PCT/IL2020/050907 dated Nov. 30, 2020.
International Search Report for PCT App. No. PCT/IL2019/050993 dated Dec. 31, 2019.
European Search Report for European App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005; vol. 17(2): pp. 232-243.
European Search Report for European Application No. EP20202094.7 dated Mar. 22, 2021.
International Search Report for PCT Application No. PCT/IL2020/051287 dated Mar. 25, 2021.
International Search Report for PCT Application No. PCT/IL2020/051291 dated Jan. 25, 2021.
Ren, Zhongzheng; Lee, Yong Jae; Ryoo. Learning to Anonymize Faces for Privacy Preserving Action Detection. European Conference on Computer Vision (ECCV), Jul. 26, 2018.
International Search Report for PCT Application No. PCT/IL2020/051286, dated Mar. 18, 2021.
Naruniec et. al. "High-Resolution Neural Face Swapping for Visual Effects", Eurographics Symposium on Rendering 2020, vol. 39, No. 4 (2020).
Thies et al. "Deferred Neural Rendering: Image Synthesis using Neural Textur", ACM Transactions on Graphics, vol. 38, Issue 4, Jul. 2019.
Thies et al. "Neural Voice Puppetry: Audio-driven Facial Reenactment", ECCV 2020 (available online Dec. 11, 2019).
Ha et al. "MarioNETte: Few-shot Face Reenactment Preserving Identity of Unseen Targets", The Thirty-Fourth AAAI Conference on Artificial Intelligence (AAAI 2020), pp. 10893-10900 (available online Nov. 19, 2019).

* cited by examiner

SYSTEM AND METHOD FOR VOICE DRIVEN LIP SYNCING AND HEAD REENACTMENT

CROSS-REFERENCE TO RELATED APPLICATIONS

This application claims the benefit of U.S. Provisional Patent Application No. 63/052,061, filed Jul. 15, 2020, which is hereby incorporated by reference in its entirety.

FIELD OF THE INVENTION

The present invention relates generally to Neural Networks (NNs). More specifically, the present invention relates to artificial NN (ANN) based for lip syncing and face reenactment.

BACKGROUND OF THE INVENTION

Lip syncing methods are commonly used in a variety of applications and utilizations, for example, virtual assistants, video conferencing, movies, television shows, commercials, video logs and online lectures. The rise of international and worldwide broadcasting and conferencing services has led to an increased demand for a large variety of use cases that require automatic and efficient lip-syncing methods, including audio-driven video avatars, video dubbing, and text-driven videos.

Commonly used solutions including editing of prerecorded video and audio-driven facial video synthesis suffer from deficiencies in synchronization between the voice and the lip movement of the performing actor. There is a need for providing realistic lip-synching methods to associate visuals of a face with audio signals by manipulating the lips of a person in a video to match the sound of some input stream.

SUMMARY OF THE INVENTION

Some embodiments of the invention include a system and a method for voice driven animation of an object in an image including sampling an input video, depicting a puppet object to obtain an image, receiving audio data, extracting voice related features from the audio data, producing an expression representation based on the voice related features, wherein the expression representation is related to a region of interest, obtaining, from the image, auxiliary data related to the image, and generating a target image based on the expression representation and the auxiliary data.

Some embodiments of the invention may include appending the target image to a previously generated target image to produce an output video depicting animation of the puppet object featuring the audio data.

According to some embodiments of the invention, the region of interest may include an area including a mouth of the puppet object and a neck area of the puppet object.

According to some embodiments of the invention, the expression representation corresponds to an appearance of the region of interest.

Some embodiments of the invention may include producing the expression representation by matching the expression representation to an identity of the puppet object.

Some embodiments of the invention may include producing the expression representation further by generating the expression representation based on controlling information.

According to some embodiments of the invention, the voice related features may correspond to a sentiment of a puppet object depicted in the received audio data.

According to some embodiments of the invention, the auxiliary data may include data related to the puppet object and supplementary data related to a scene represented in the image.

Some embodiments of the invention may include performing a training stage by repeating the steps of sampling, extracting, producing, obtaining and generating a target image. During the training stage the audio data is the audio data of the input video.

Some embodiments of the invention may include processing the received audio data by representing the received audio data by a spectrogram representation.

Some embodiments of the invention may include processing the received audio data by representing the received audio data by an acoustic word embeddings representation.

Some embodiments of the invention may include a system for voice driven animation of an object in an image, the system may include a memory, and a processor configured to: sample an input video, depict a puppet object to obtain an image, receive audio data, extract voice related features from the audio data, produce an expression representation based on the voice related features wherein the expression representation is related to a region of interest, obtain, from the image, auxiliary data related to the image, and generate a target image based on the expression representation and the auxiliary data.

According to some embodiments of the invention, the processor may be further configured to append the target image to a previously generated target image to produce an output video depicting animation of the puppet object featuring the audio data.

According to some embodiments of the invention, the processor may be further configured to produce the expression representation by matching the expression representation to an identity of the puppet object.

According to some embodiments of the invention, the processor may be further configured to perform a training stage by repeating the steps of sample, extract, produce, obtain and generate a target image, wherein during the training the audio data is the audio data of the input video.

Some embodiments of the invention may include a method for voice driven animation of an object in an image, the method may include analyzing a received audio data to extract voice related features from the audio data, generating, based on the voice related features, an expression representation, sampling an input video, depicting a puppet object, to obtain an image, predicting, from the image, auxiliary data related to the puppet object and supplementary data related to a scene represented in the image, generating a region of interest of the puppet object based on the expression representation and the auxiliary data, and generating a target image by combining the region of interest of the puppet object and the supplementary data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
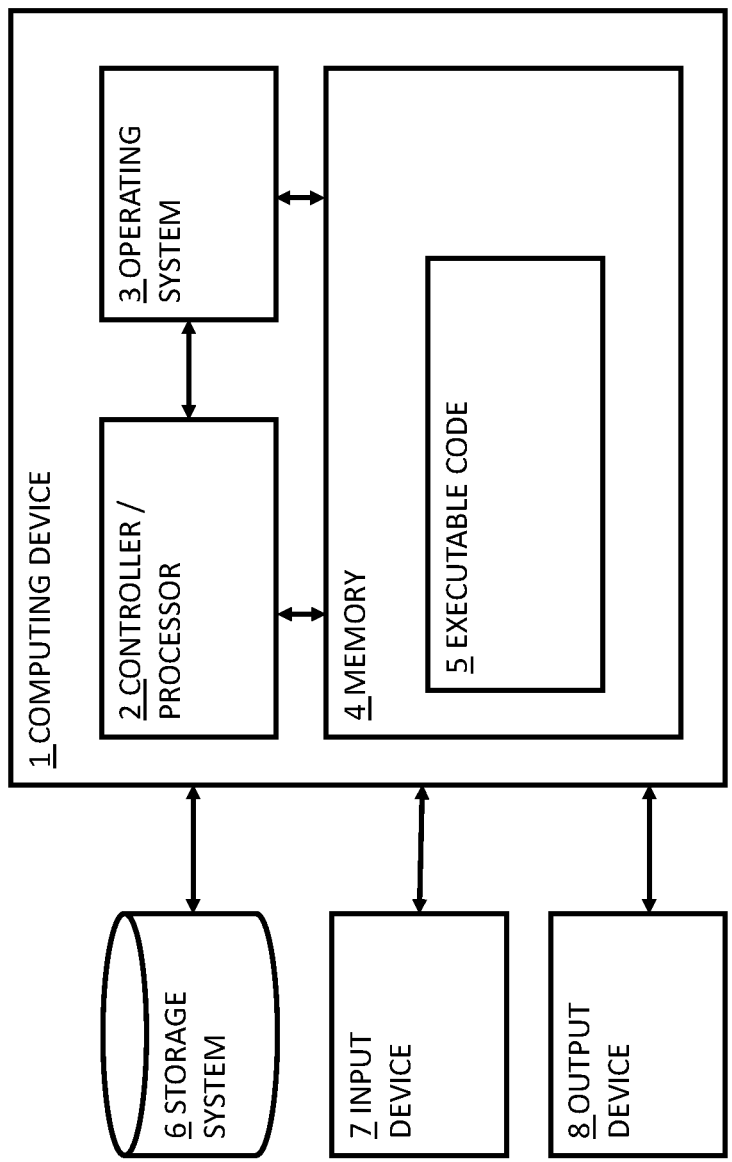
FIG. 1 is a block diagram, depicting a computing device which may be included in a system for artificial neural network based animation, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

One skilled in the art will realize that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are, therefore, intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions which when executed by a processor cause the processor to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

The term "puppet" may be used herein to refer to any object included or depicted in an image or frame that may be animated or driven by a received audio signal according to embodiments of the invention. For example, the "puppet" object may be an actor, a presenter, a lecturer or any other object in an image that may be animated so as to speak or be dubbed by an external audio signal.

The terms "driver" or "driver voice" "driver sound" may be used herein to refer to any audio signal or audio data which includes voice, sound, or any form of audio that may be used to dub or replace an original sound or voice of a puppet object during animation or lip sync process according to some embodiments of the invention.

The terms "output" and "target" may be used interchangeably in relation to indicate one or more output image or video elements that may be produced by some embodiments of the invention and may include an animated version of a puppet object implementing lip syncing and face reenactment methods, as elaborated herein.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for ANN based animation for lip syncing and face reenactment, according to some embodiments of the invention.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to some embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tF5025 asks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may execute (e.g., train and/or infer) an artificial neural network to animate (e.g., convert from a still image to a moving image typically including a series of still images played as a video, movie or moving image) at least one image, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more machine learning (ML) modules may be stored in storage system 6 and may be loaded from storage system 6 into memory 4 where it may be processed by processor or controller 2, to perform animation of at least one image, for example by executing or simulating a NN. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A NN or ANN, e.g., a NN implementing machine learning (ML), may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons, and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations: for example, a processing system as in FIG. 1 may execute a NN by performing operations on the mathematical representation of the NN. ML based models, such as models implemented by artificial ANN or NN, may be regarded as implementing a function, associating between input data and output data.

Some embodiments of the invention may include a method and system to perform voice driven lip syncing and or head reenactment. The methods and system of some embodiments of the invention may be used independently or in conjunction with other lip syncing and face reenactment methods. Methods and system of some embodiments of the invention may include conditional deep learning generator to produce a region of interest (ROI), e.g., lips area, entire head or other region that includes a human face and a desired output voice stream under the condition of an input video streams and/or processed audio stream.

Figure 2:
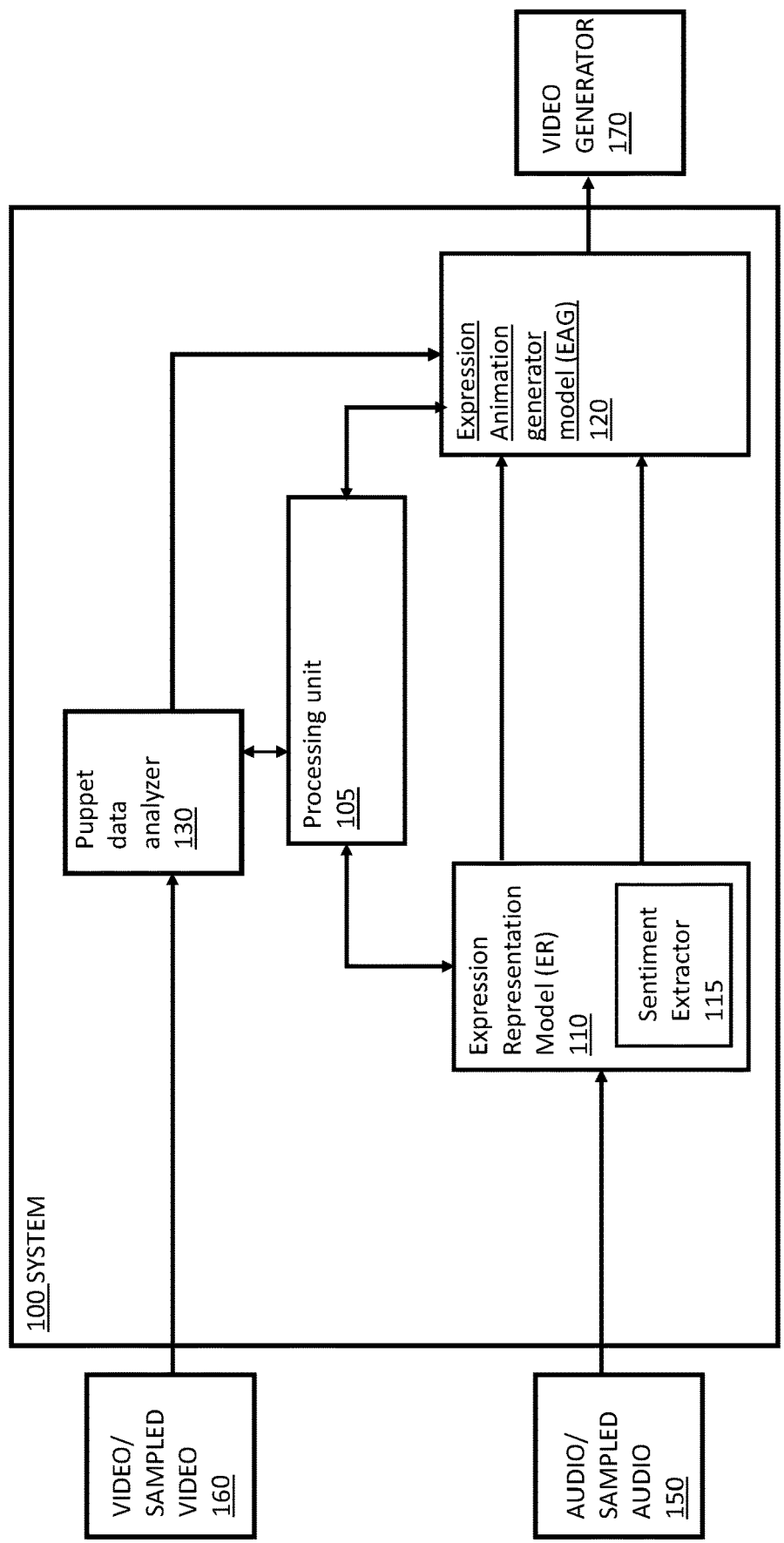
FIG. 2 is a block diagram, depicting an example of a system for ANN based voice driven animation, according to some embodiments of the invention.

Reference is now made to FIG. 2, which is a block diagram, depicting an example of a system for ANN based voice driven animation, according to some embodiments of the invention. System 100 and/or each of the blocks, elements and/or modules of system 100 which are described herein may be implemented as a software module, a hardware module or any combination thereof. For example, system 100 may be or may include a computing device such as element 1 of FIG. 1 and may be adapted to execute one or more modules of executable code (e.g., element 5 of FIG. 1) to perform voice driven animation, as further described herein. Much of the examples brought herein relate to embodiments in which the animated object is that of a face. However, it may be appreciated by a person skilled in the art that similar implementations may be utilized to animate other types of objects (e.g., body parts, cars, plants, animals, etc.), with the required modifications.

According to some embodiments of the invention, ANN based voice driven animation system 100 may include a processing unit 105, a puppet data analyzer 130, an ANN based expression representation (ER) model 110, an ANN based expression animation generator (EAG) model 120. System 100 may receive audio data from an audio data module 150. System 100 may further receive video data and/or sampled video data from a video module 160 which may generate sampled video data to receive one or more images or frames. In some embodiments of the invention, a plurality of images or frames generated may be concatenated, joined or combined by a video generator 170 to create a realistic animated video data depicting animation of a puppet object, included in the received video featuring a received audio data, e.g., by synchronizing lips, face and head movements to match the received audio data. The puppet object or character depicted in the video also referred to herein as "actor" may appear to be speaking voice included in the received audio signal.

According to some embodiments of the invention, audio data module 150 may provide audio signals or audio data to system 100, e.g., as a signal or as samples of the audio signal. Audio data module 150 may sample audio signals according to a predetermined sampling rate such as to fit or match a sampling rate of an input video signal. In some embodiments of the invention, audio data module 150 may be implemented as a module or block of system 100 while in other embodiments of the invention, audio data module 150 may be external to system 100, e.g., an external system, an external provider and the like. System 100 may receive voice or audio inputs which may include a driver voice. The audio data of the audio input signals may be used by system 100 as a dubbing sound of a received video signal according to embodiments of the invention. In some embodiments of the invention, system 100 may further receive an original video input containing an original puppet object or actor sound and the audio signal of the video input may be used according to some embodiments of the invention, e.g., as ground truth data for a training phase of system 100.

According to some embodiments of the invention, audio input streams or audio data frames or samples may be processed by audio data module 150 into one or more audio data representations by one or more audio data processing methods. For example, the audio signals may be processed and provided to system 100 as one or more spectrogram images. A spectrogram image may capture the amplitude of each frequency in the speaker's voice over time in the input audio signal and may fit the ANN based architecture of the ANN based expression representation (ER) model 110. Another exemplary method of processing the input audio signals may be acoustic word embeddings (AWE) which may provide a fixed-dimensional representation of a variable-length audio signal in an embedding space. AWE methods may be used in ANN based modules to be trained in an unsupervised manner. Any other method, process, technique or practice of audio signal processing may be used and implemented by audio data module 150. According to some embodiments of the invention, the AWE representation may be received as an output of an external NN.

ANN based expression representation (ER) model 110, also referred to herein as "ER model" may be a ML based model. ER model 110 may receive audio data, e.g., sampled audio data also referred to herein as "audio frames" from audio data module 150. The received audio data, e.g., each audio frame, may be analyzed and processed by ER model 110 to produce expression representation based on the voice or sound of a driver object included in the received audio data. ER model 110 may include a ML based NN which may be trained to generate, produce, create or determine an expression representation which depicts an expression, or a facial expression of a speaker (or voice originator) recorded in the audio signal.

According to some embodiments of the invention, ER model 110 may extract voice related features from the audio data. The features extracted may be voice related characteristics, parameters, and/or attributes. Each of the extracted voice features may indicate, imply or provide information related to a facial expression. A facial expression may be one or more motions or positions of the muscles beneath the skin of the face or the face area while producing a sound, voice, vowel, word, and the like. ER model 110 may generate or produce an expression representation based on the voice related features extracted from the audio data. According to some embodiments of the invention, the expression representation may be related to a predetermined region of interest (ROI) which may be face, partial area of a face, face area, e.g., including the neck, ears or any other organ. The expression representation related to an ROI may include, for example, a mouth, lips, neck area and/or face area position or movements while speaking, syllabling, pronouncing or communication, e.g., a syllable. For example, when a driver object pronounces the vowel sound of "o", the mouth and lips may have a round shape, and the expression representation may define the round shape of the lips and mouth area.

According to some embodiments of the invention, the term "voice related feature" may be used herein to refer to a measurable property of the audio data. For example, in audio data depicting voice or sound of a driver object, the voice related features may represent or describe specific properties of the depicted driver voice. A voice related feature may include, for example a data structure, such as a vector represented by numerical elements. Any other data structure may be used. In some embodiments, voice related feature may be expressed by, or emitted as an output layer of neural nodes of ER model 110. However it may be clear to a person skilled in the art that other implementations for extracting voice related feature may also be possible.

According to some embodiments of the invention, ER model 110 may transform speech, sound or voice of a driver into corresponding expression, position, look or appearance of ROI by analyzing a received sampled audio data and extracting voice related features from the audio data. Based on the voice related features, an expression representation related to a ROI may be generated. The expression representation related to the ROI may correspond to an appearance of the region of interest. For example, the expression representation related to a ROI may correspond to an appearance of the face, neck area, mouth and/or lips while a unit of pronunciation, e.g., a vowel, a syllable, a noun, a word, phrase, a part of a word and the like is pronounced.

According to some embodiments of the invention, ER model 110 may further include a sentiment extractor 115. Sentiment extractor 115 may analyze the received audio data and may extract voice related features that correspond to a sentiment, feeling, mood, emotion or any emotional state of the driver depicted in the received audio data. The voice related features extracted by sentiment extractor 115 may correspond to a sentiment of a driver object depicted in the receiving audio data, e.g., correspond to movements or position of face area while conveying an emotional state of the driver object. Extracting the voice related features which correspond to a sentiment may allow ER model 110 to refine, improve or enhance the generated expression representation. For example, based on the voice related features which correspond to a sentiment, an expression representation may represent a position or movement of the lips while pronouncing a certain syllable or sound in a certain mood or state of mind, e.g., happy, sad, formal, or casual.

In some embodiments of the invention, ER model 110 may receive additional controlling information, parameters, instructions, or any other form of additional controlling information. Controlling information may be an input to ER model to further enhance, augment, define or improve the generation of the expression representation. ER model 110 may generate the expression representation based on controlling information. For example, additional controlling information may include information regarding a required sentiment, feeling, mood, emotion or any emotional state which may be added or influence the generation of the of the expression representation. The additional controlling information may allow controlling the final version of the expression representation generated by ER model 110. For example, additional controlling information may include information regarding a mood of a speaker, and the generated expression representation may be generated to show the selected mood, although this mood may not be included in the original audio data.

In some embodiments of the invention, the additional controlling information may replace the operation of sentiment extractor 115, while in some other embodiments, the additional controlling information may improve or enhance operation of sentiment extractor 115, e.g., by defining voice related features.

In some embodiments of the invention, the ER model 100 may produce an identity related expression representation which may match a specific identity of a puppet object, e.g., by an identity expression representation (IER) model 140 as described with reference to FIG. 3.

According to some embodiments of the invention, system 100 may receive from video data module 160 input video or sampled input images, each depicting a puppet object or actor which may be animated by a driver voice received from audio data module 150, as described in embodiments of the invention. Video data module 160 may provide video signals, depicting a puppet object, to system 100. Video data module 160 may sample the input video, to obtain an image or frame depicting the puppet object or the actor. In some embodiments of the invention, the sampled video data, e.g., one or more images or frames may be transferred as input to system 100, e.g., as samples of the input video signal, while in some other embodiments of the invention, video data module 160 may transfer video signals and the sampling process may be performed by a dedicated unit or module of system 100. The sampling rate or the transfer rate of images to system 100 may be a predetermined rate, while a sampling rate of the audio signal received from audio data module 150 may be modified or adjusted such as to fit to the sampling rate of the video signal. In some embodiments of the invention, video data module 160 may be implemented as a module or block of system 100, while in some other embodiments of the invention, video data module 160 may be external to system 100, e.g., an external system, an external provider, and the like.

According to some embodiments of the invention, puppet data analyzer 130 may receive the sampled images depicting the puppet object, and may analyze and process the received images to obtain, extract, predict or determine auxiliary data related to the image. Puppet data analyzer 130 may obtain or extract from the image information which can not be extracted or obtained from the audio signal in order to enhance the expression of the puppet depicted in a target image. The auxiliary data may include features, characteristics, attributes, or elements related to content of the image. The auxiliary data may include data related to the puppet object in the image and supplementary data related to a scene represented in the image. The supplementary data may represent, be related to, and characterize elements or areas in the image which may not relate to the puppet object. The supplementary data may include information, characteristics, attributes and features which may represent a scene depicted in the image, e.g., a background texture, a camera viewpoint, lightning conditions and the like.

According to some embodiments of the invention, the auxiliary data related to the puppet object may include features, characteristics, attributes, or elements which represent, are related to and characterize elements or areas in the image which may relate to the puppet object. The auxiliary data related to the puppet object may be separated or categorized into two types of puppet related data: a) data related to the ROI of the puppet, and b) data related to a region external to the ROI. The auxiliary data related to the ROI of the puppet may include, for example, features, characteristics, attributes, or elements which represent the ROI of the puppet, e.g., skin color, mouth color, mouth shape, face shape, skin texture, mouth and lips appearance, and the like. The auxiliary data related to a region external to the ROI of the puppet may include, for example, features, characteristics, attributes, or elements which represent areas external to the ROI of the puppet, e.g., eyes color, eyes blinks, cheeks appearance, forehead appearance, and the like.

According to some embodiments of the invention, the auxiliary data obtained or extracted by puppet data analyzer 130 may be processed by processing unit 105 which may transfer the required auxiliary data to ER model 110 and/or to ANN based expression animation generator model (EAG) 120, e.g., data related to the puppet object in the image may be delivered to ER model 110, and supplementary data related to a scene represented in the image may be delivered to ANN based expression animation generator model (EAG) 120.

According to some embodiments of the invention, ANN based expression animation generator model (EAG) 120, also referred to herein as "EAG model" may be a ML based model. EAG model 120 may receive the auxiliary data including a) data related to the puppet object in the image and b) supplementary data related to a scene represented in the image. The auxiliary and/or supplementary data may be received from puppet data analyzer 130 directly or via processing unit 105. Additionally, EAG model 120 may receive the expression representation from ER model 110.

In some embodiments of the invention, EAG model 120 may include a ML based NN which may be trained to generate, produce, or create a target output image by modifying or combining the image based on the region of interest of the puppet object and the supplementary data. EAG model 120 may generate a target image based on the expression representation and the auxiliary data. EAG model 120 may use expression representation received from ER model 110 and additional auxiliary data received from puppet data analyzer 130 to combine the original image sampled from the video data and the original sampled audio signal. EAG model 120 may create an output image which depicts a realistic representation of the puppet object, depicted in the sampled video image with an expression representation of the ROI which may fit to the audio signal.

According to some embodiments of the invention, EAG model 120 may receive from puppet data analyzer 130 any information which may not be extracted or obtained from the audio data. The auxiliary data may further include any information from an image which may be used by EAG model 120 to generate the target image. EAG model 120 may generate the ROI of the puppet based on the expression representation from ER model 110 and may generate all other elements, regions and data of the target image from the auxiliary data extracted from the image. For example, EAG model 120 may transfer face expression from an external video frame and may control the face expression by the additional controlling information, e.g., which may be provided by a user or an operator of system 100.

According to some embodiments of the invention, system 100 may be trained during a training phase, or training procedure in which system 100, e.g., ER model 110, EAG model 120 and puppet data analyzer 130 may be trained to produce realistic expressions animations. After the training procedure is completed, system 100 may move to an inference stage in which system 100 may create new content based on voice sample and auxiliary data. Processing unit 105 may use a large dataset of video clips, depicting puppet objects and a large dataset audio signals to train the neural networks of ER model 110, EAG model 120 and puppet data analyzer 130. During the training process or stage, ER model 110, EAG model 120 and puppet data analyzer 130 may run or operate iteratively or repeatedly on training dataset, until a stopping condition is met, indicating that ER model 110 and/or EAG model 120 and/or puppet data analyzer 130 are brought to perform in a satisfactory level. In some embodiments of the invention, during the training stage, the audio data may be the audio data of the input video signal which may serve as ground truth, e.g., as it may produce an ideal expected result.

For example, the neural networks of ER model 110 and/or EAG model 120 may be trained in a self-supervised manner, as elaborated herein. A stopping condition may be a predetermined quality value related to a reconstruction quality of the target image or the output video. For example, processing unit 105 may compute or may process a similarity level or difference level between the generated image and an original sampled image of a video signal (including audio). Alternatively, or additionally, EAG model 120 may be trained to produce or generate a realistic expression animation by minimizing a loss value, The loss value may include one or more loss components, for example, the loss value may include an adversarial loss value which may aim to improve the operation of EAG model 120 when the output video looks uncanny.

Additionally, or alternatively, the loss value may include a reconstruction loss which may aim to improve the operation of EAG model 120 when the output video includes un-accurate expression reenactment. Processing unit 105 may compute reconstruction loss and/or adversarial loss and may determine that ER model 110 and/or EAG model 120 operate at a satisfactory level when a computed loss values is beneath a predefined value (e.g., the stopping condition). According to some embodiments of the invention, ER model 110, EAG model 120 and puppet data analyzer 130 may use processing unit 105 for performing any operation and/or any required processing.

The plurality of output target images generated by EAG model 120 may be transferred to video generator 170. In some embodiments of the invention, video generator 170 may be implemented or included in system 100, e.g., as a module or block of system 100, while in other embodiments of the invention, video generator 170 may be external to system 100. Video generator 170 may be adapted to append, concatenate, or assemble a plurality of output images or target images, generated by EAG model 120, to produce an output video data. For example, video generator 170 may append each of the output images to a previous output image in a timewise sequential order, so as to produce a video clip that may be, for example, displayed on a screen (e.g., element 8 of FIG. 1) of a computing device (e.g., element 8 of FIG. 1) as temporally consistent video sequence.

During the process of system 100, a plurality of target images may be generated, and each generated image may be appended, combined or assembled to the previous generated output images. A new generated image may be added to a video being assembled, to produce or obtain an output video. For example, video generator 170 may append or concatenate output images 40 in a timewise sequential order, to produce a video clip that may be displayed on a screen. For each input sampled image and a respective sampled audio frame, system 100 may generate a respective output or target image depicting the puppet object of the sampled image having an expression and face appearance that may fit to the audio data of the audio frame.

Figure 3:
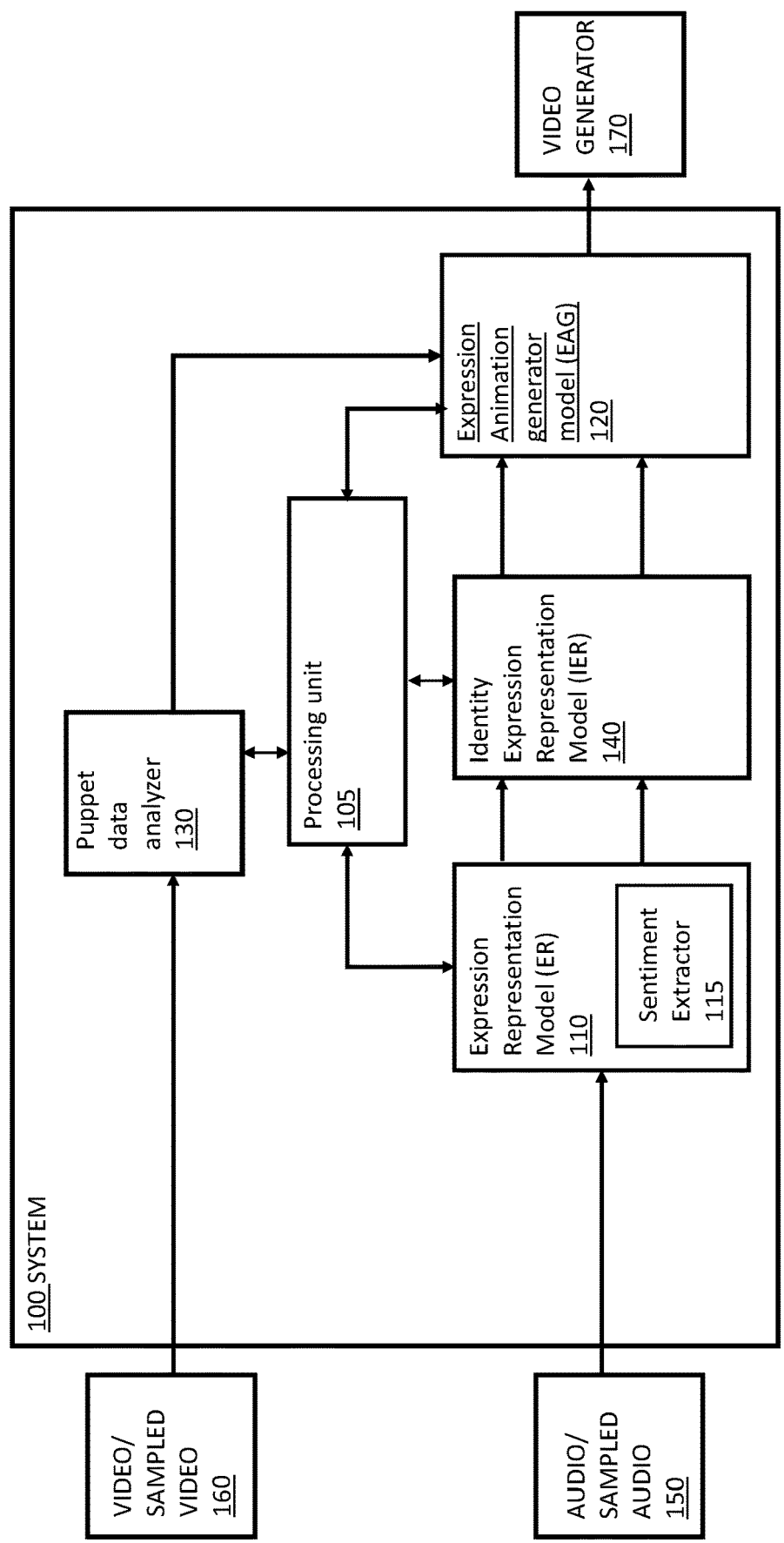
FIG. 3 is a block diagram, depicting another example of a system for ANN based voice driven animation, according to some embodiments of the invention.

Reference is now made to FIG. 3, which is a block diagram, depicting another example of a system for ANN based voice driven animation, according to some embodiments of the invention. According to some embodiments, components, units, block or elements of system 100 presented in FIG. 3 are carried out similarly as described elsewhere herein, e.g., as described in FIG. 2. Additional element, identity expression representation model (IER) 140, also referred to herein as IER model 140, may be added to embodiments of the method and system presented with reference to FIG. 2.

It should be understood to a person skilled in the art that the system and methods described with reference to FIG. 2 and FIG. 3 may be carried out similarly as described elsewhere herein and may further carry out other methods additionally and/or alternatively. System 100 may be implemented as a software module, a hardware module or any combination thereof. For example, system may be or may include a computing device such as element 1 of FIG. 1 and may be adapted to execute one or more modules of executable code (e.g., element 5 of FIG. 1) to perform animation of at least one image, as further described herein.

System 100 may further include IER model 140 which may generate or produce an identity related expression representation which may match a specific identity of a puppet object. It should be understood to a person skilled in the art that, according to some embodiments of the invention, system 100 may operate without IER model 140 to generate a general, generic or common expression representation as described with reference to FIG. 2. While in other embodiments of the invention, e.g., as described with reference to FIG. 3, system 100 may operate with IER model 140 to generate a specific, dedicated, personalized, or customized expression representation which may match or fit to a specific identity, e.g., by personalization of the operation of ER model 120.

Additionally, it should be understood to a person skilled in the art that system 100 may operate with IER model 140 but without enabling or using the functionality of IER model 140, e.g., IER model may implement an identity function, to generate a general expression representation as described with reference to FIG. 2. The ability to choose whether or not to use IER model 140 may allow system 100 to achieve high fidelity results as using only ER model 120 for general expression representation generation may require minimal training time and, therefore, may reach the inference stage quickly, while higher fidelity results may be reached by using IER model 140 for dedicated expression representation generation per puppet. IER model 140 may use the general expression representation as a starting point of the training stage which may greatly reduce training time.

According to some embodiments of the invention, IER model 140 may be a ML based model. IER model 140 may receive the auxiliary data, including data related to the puppet object in the image from puppet data analyzer 130 directly or via processing unit 105. IER model 140 may be used to modify the general expression representation generated by ER model 110 to specifically match a personality or identity of a puppet by a dedicated training which involve use of the auxiliary data. For example, usually when every person pronounces a specific vowel sound their mouth and lips may move in a similar way, but each person may have unique features which may be specific to him.

IER model 140 may receive, from puppet data analyzer 130, auxiliary data related to a specific puppet, actor, presenter or person depicted in an input image and may modify the expression representation generated by ER model 120 to include specific features, attributes or characteristics which uniquely define a specific identity. The auxiliary data which may be used by IER model 140 may be data related to the ROI of the puppet so as to modify, adjust or change the expression representation generated by ER model 120 to a specific identity of a puppet. The auxiliary data related to the ROI of the puppet may include, for example, features, characteristics, attributes or elements which represent the ROI of the puppet, e.g., skin color, mouth color, mouth shape, face shape, skin texture, mouth and lips appearance, and the like. The identity related expression representation generated by IER model 140 may serve as an input to EAG 120 which is described in detail with reference to FIG. 2.

According to some embodiments of the invention, the identity related expression representation generated by IER model 140 may serve as an input to EAG 120 which is described in detail with reference to FIG. 2. In some embodiments of the invention which may include only ER model 120, a target image may be generated by EAG 120 based on a general, global, or generic expression representation and the auxiliary data, while in some other embodiments of the invention which may include both ER model 120 and IER model 140, a target image may be generated by EAG 120 based on a dedicated, identity specific expression representation and the auxiliary data. EAG 120 may receive additional information related to the puppet, e.g., information which may not relate to the ROI, and the target image may be generated by using the additional information.

Figure 4:
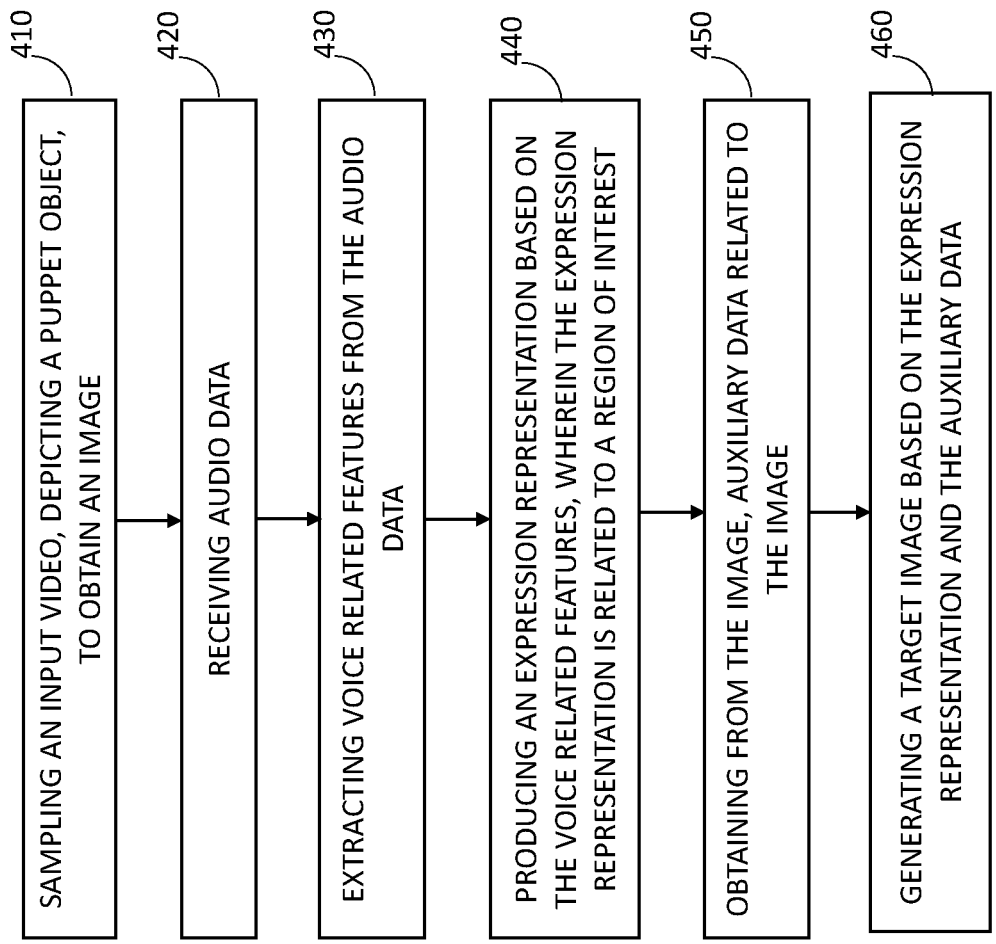
FIG. 4 is a flow diagram, depicting a method of ANN based voice driven animation, according to some embodiments of the invention.

FIG. 4 is a flow diagram, depicting a method of ANN based voice driven animation, according to some embodiments of the invention. Some of the operations of FIG. 4 may be related or may be similar, analogues and/or may match operations performed, for example, by the systems shown in FIGS. 1-3.

In operation 410, an input video, depicting a puppet object, may be sampled to obtain an image. Some embodiments of the invention may include animation of the puppet object or actor by producing an output video depicting animation of the puppet object from the input video and audio data from a different audio signal, e.g., not the original audio of the input video.

In operation 420, audio data may be received. According to some embodiments of the invention, the lips, face and head movements of the puppet object mat be synchronized to match the received audio data.

In some embodiments of the invention, the audio signals or audio data may be sampled according to a predetermined sampling rate so as to fit or match a sampling rate of an input video signal. According to some embodiments of the invention, the audio signal of the input video may be used for training the ML based models, e.g., EAG model 120 and/or ER 110 and/or puppet data analyzer 130. During the inference stage, the region of interest of a puppet object from the original video signal may be synchronized to a driver voice included in the received audio signal.

In operation 430, voice related features may be extracted from the audio data by, for example, ER model 110 of system 100. The features extracted may be voice related characteristics, parameters, and/or attributes. Each of the extracted voice features may indicate, imply or provide information related to a facial expression, e.g., one or more motions or positions of the face or the face area while producing a sound, voice, vowel, word, and the like. In some embodiments of the invention, the voice related features may correspond to a sentiment of a puppet object depicted in the received audio data.

In operation 440, an expression representation may be produced based on the voice related features, e.g., by ER model 110 of system 100. The expression representation may be related to a ROI which may include an area including a mouth of the puppet object and a neck area of the puppet object. The expression representation related to the ROI may correspond to an appearance of the region of interest. For example, the expression representation related to a ROI may correspond to an appearance of the ROI, e.g., a face, mouth and/or lips while producing a specific sound, speech or voice. According to some embodiments of the invention, producing the expression representation may further include matching the expression representation to an identity of the puppet object, e.g., by IER model 140. IER model 140 which may generate or produce an identity related expression representation which may match a specific identity of a puppet object. In some embodiments of the invention, the expression representation may be produced or generated based on controlling information which may be provided by an external user or operator.

In operation 450, auxiliary data related to the image may be obtained or predicted from the image, e.g., by puppet data analyzer 130 of system 100. The video data may be analyzed and processed to obtain, extract, predict or determine auxiliary data related to the image, e.g., any image information which may not be extracted or obtained from the audio signal in order to enhance the expression of the target image. The auxiliary data may include features, characteristics, attributes or elements related to content of the image. The auxiliary data may include data related to the puppet object in the image and supplementary data related to a scene represented in the image. Additionally, the auxiliary data related to the puppet object may include a) data related to the ROI of the puppet and b) data related to a region external to the ROI.

In operation 460, a target image may be generated based on the expression representation and the auxiliary data, e.g., by EAG model 120 of system 100. EAG model 120 may use expression representation, e.g., received from ER model 110 or from IER model 140, and additional auxiliary data received from puppet data analyzer 130 to combine the original image sampled from the video data and the original sampled audio signal into a target image. The target, output image may include a realistic representation of the puppet object, depicted in the sampled video image with an expression representation of the ROI that may fit the received audio data.

Some embodiments of the invention may include repeating the steps of operations 410-460 and appending each output target image to the previous output target image to produce an output video depicting animation of the puppet object. A new generated target image may be added to a video being assembled, to produce or obtain an output video.

According to embodiments of the invention, a training stage may be performed by repeating the steps of sampling, extracting, producing, obtaining and generating a target image, namely steps of operations 410-460, while during the training stage, the audio data used may be the audio data of the input video. This may allow to achieve optimal training results of ML based models, e.g., EAG model 120 and/or ER 110 and/or puppet data analyzer 130.

Some embodiments of the invention may include generating a region of interest of the puppet object based on the expression representation and the auxiliary data and generating the target image by modifying or combining the image based on the region of interest of the puppet object and the supplementary data.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for voice driven animation of an object in an image, the method comprising:
sampling an input video, depicting a puppet object, to obtain an image;
receiving audio data including a sound;
extracting, by an expression representation (ER) model, voice related features from the audio data, wherein the voice related features provide information related to positions of face muscles while producing the sound;
producing an appearance of the face while producing the sound based on the voice related features;
obtaining, from the image, by a puppet data analyzer, auxiliary data related to content of the image; and
generating, by an expression animation generator (EAG) model, a target image based on the appearance of the face while producing the sound and the auxiliary data,
wherein the ER model, the puppet data analyzer and the EAG model are trained in a self-supervised manner by repeating the steps of sampling, extracting, producing, obtaining and generating a target image until a predetermined quality value related to a reconstruction quality of the target image is reached, wherein during the training stage the audio data is an audio signal of the input video.

2. The method of claim 1, further comprising appending the target image to a previously generated target image to produce an output video depicting animation of the puppet object featuring the audio data.

3. The method of claim 1, wherein the facial area comprises an area including a mouth of the puppet object and a neck area of the puppet object.

4. The method of claim 1, wherein producing the positions of the face muscles while producing the sound further comprises matching the positions of the face muscles while producing the sound to an identity of the puppet object.

5. The method of claim 1, wherein producing the appearance of the face while producing the sound further comprises generating the appearance of the face while producing the sound based on controlling information.

6. The method of claim 1, wherein the voice related features correspond to a sentiment of a puppet object depicted in the received audio data.

7. The method of claim 1, wherein the auxiliary data comprises data related to the puppet object and supplementary data related to a scene represented in the image.

8. The method of claim 1, wherein processing the received audio data comprises representing the received audio data by a spectrogram representation.

9. The method of claim 1, wherein processing the received audio data comprises representing the received audio data by an acoustic word embeddings representation.

10. The method of claim 1, wherein producing the appearance of the face while producing the sound is performed by a neural network that is trained to produce the appearance of the face while producing the sound based on the voice related features.

11. A system for voice driven animation of an object in an image, the system comprising:
a memory; and
a processor configured to:
sample an input video, depicting a puppet object, to obtain an image;
receive audio data including a sound;
extract, by an expression representation (ER) model, voice related features from the audio data, wherein the voice related features provide information related to positions of face muscles while producing the sound;
produce an appearance of the face while producing the sound based on the voice related features;
obtain, from the image, by a puppet data analyzer, auxiliary data related to content of the image; and
generate, by an expression animation generator (EAG) model, a target image based on the appearance of the face while producing the sound and the auxiliary data,
wherein the ER model, the puppet data analyzer and the EAG model are trained in a self-supervised manner by repeating the steps of sampling, extracting, producing, obtaining and generating a target image until a predetermined quality value related to a reconstruction quality of the target image is reached, wherein during the training stage the audio data is an audio signal of the input video.

12. The system of claim 11, wherein the processor is further configured to append the target image to a previously generated target image to produce an output video depicting animation of the puppet object featuring the audio data.

13. The system of claim 11, wherein the facial area comprises an area including a mouth of the puppet object and a neck area of the puppet object.

14. The system of claim 11, wherein the processor is further configured to produce the appearance of the face while producing the sound by matching the appearance of the face while producing the sound to an identity of the puppet object.

15. The system of claim 11, wherein the voice related features correspond to a sentiment of a puppet object depicted in the received audio data.

16. The system of claim 11, wherein the auxiliary data comprises data related to the puppet object and supplementary data related to a scene represented in the image.

17. The system of claim 11, wherein the processor is further configured to produce the appearance of the face while producing the sound using a neural network that is trained to produce the appearance of the face while producing the sound based on the voice related features.

18. A method for voice driven animation of an object in an image, the method comprising:
analyzing, by an expression representation (ER) model, a received audio data including a sound to extract voice related features from the audio data, wherein the voice related features provide information related to positions of face muscles while producing the sound;

generating, based on the voice related features, the appearance of the face while producing the sound;

sampling an input video, depicting a puppet object, to obtain an image;

predicting, from the image, by a puppet data analyzer, auxiliary data related to the puppet object and supplementary data related to a scene represented in the image;

generating the facial area of the puppet object based on the appearance of the face while producing the sound and the auxiliary data; and generating, by an expression animation generator (EAG) model, a target image by combining the facial area of the puppet object and the supplementary data, wherein the ER model, the puppet data analyzer and the EAG model are trained in a self-supervised manner by repeating the steps of sampling, extracting, producing, obtaining and generating a target image until a predetermined quality value related to a reconstruction quality of the target image is reached, wherein during the training stage the audio data is an audio signal of the input video.

* * * * *